United States Patent [19]
Gosling et al.

[11] 3,939,298
[45] *Feb. 17, 1976

[54] JOINTS FOR ELECTRIC CABLES

[75] Inventors: Cyril Henry Gosling, London; David Glick, Rainhill, near Liverpool; Alan Leslie Powell, Bexleyheath; William Young Murray, Prescot, all of England

[73] Assignee: British Insulated Callender's Cables Limited, London, England

[ * ] Notice: The portion of the term of this patent subsequent to Jan. 9, 1985, has been disclaimed.

[22] Filed: Feb. 12, 1968

[21] Appl. No.: 704,763

[30] Foreign Application Priority Data
Feb. 15, 1967 United Kingdom................. 7323/67

[52] U.S. Cl................ 174/21 R; 174/15 C; 174/85
[51] Int. Cl.² ......................................... H02G 15/08
[58] Field of Search ............ 174/85, 88, 89, 78, 84, 174/19–23, 15, 15 C

[56] References Cited
UNITED STATES PATENTS

| | | | |
|---|---|---|---|
| 1,784,881 | 12/1930 | Rah...................... | 174/85 |
| 1,975,602 | 10/1934 | Halpern et al....................... | 174/85 |
| 2,060,745 | 11/1936 | Pettee...................... | 174/85 |
| 3,240,868 | 5/1966 | Ets-Hokin et al................. | 174/78 X |
| 3,363,049 | 1/1968 | Gosling et al.......................... | 174/85 |
| 3,544,700 | 12/1970 | Priaroggia......................... | 174/15 C |

FOREIGN PATENTS OR APPLICATIONS

| | | | |
|---|---|---|---|
| 932,105 | 11/1947 | France................................. | 174/21 |
| 1,086,145 | 10/1967 | United Kingdom................... | 174/21 |

Primary Examiner—Darrell L. Clay
Attorney, Agent, or Firm—Webb, Burden, Robinson & Webb

[57] ABSTRACT

The thermal resistance of a joint for fluid filled electric power cables is reduced by transversely dividing the fluid-tight enclosure of the joint into three parts, electrically insulated from each other, namely two end parts each sealed to one of the cable sheaths and to a central part of low thermal resistance. The central part preferably has a cooling jacket. If an outer enclosure for the joint is provided its central part is made of low thermal resistance.

15 Claims, 5 Drawing Figures

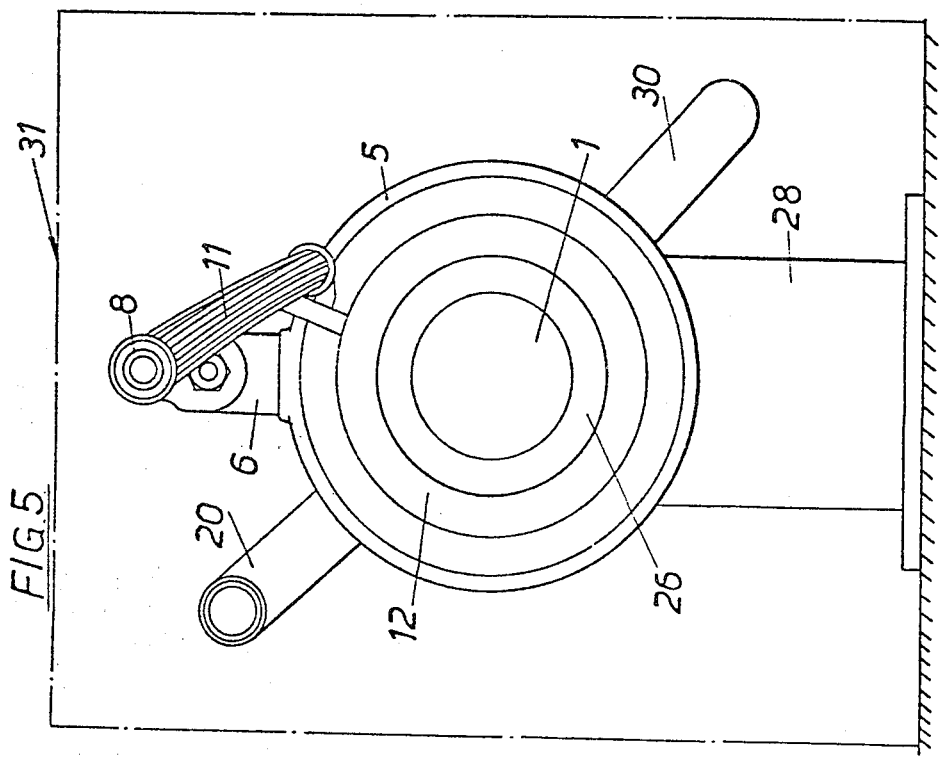
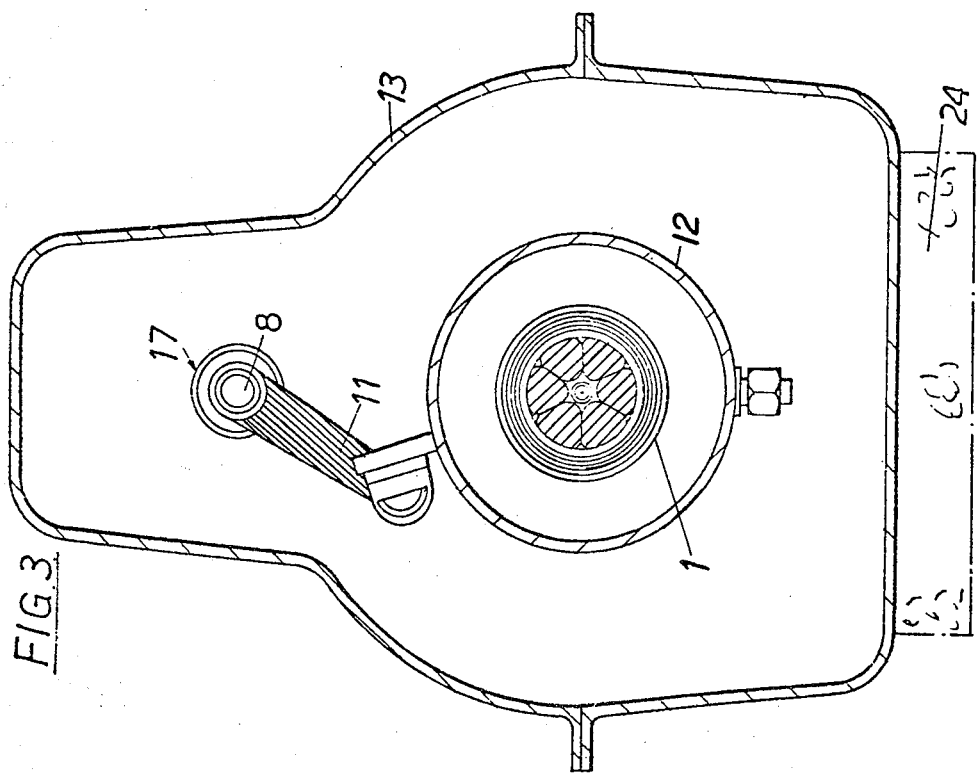

JOINTS FOR ELECTRIC CABLES

This invention is an improvement in or modification of the invention of copending application Ser. No. 499,955 filed Oct. 21, 1965, now U.S. Pat. No. 3,363,049, issued Jan. 8, 1968.

It relates to joints for metal sheathed fluid impregnated power cables, especially but not exclusively, joints for use in a cross-bonded system in which the sheaths of the two lengths of cable that are interconnected at the joint are insulated from each other and each connected to one of two bonding conductors, usually the conductors of two single core bonding cables or the two conductors of one concentric bonding cable. To reduce the surge impedance of the system it is common practice to use a concentric bonding cable having an inner conductor connected to one sheath and an outer conductor connected to the other sheath, and the invention is especially applicable to systems in which a concentric bonding cable connected in this way is used. The bonding conductors connect the sheaths of the jointed cable lengths to the sheaths of other cable lengths at a similar joint or joints, usually through a link-disconnecting box and a surge diverter. It is advantageous for the bonding conductors both to be connected to appropriate parts of the joint structure at or near the same end of the joint enclosure and the invention relates especially to cross-bonding joints which provide this facility.

The joint in accordance with the above mentioned Application comprises a fluid-tight enclosure for the cable impregnant, which surrounds the conductor joint, is sealed to the sheaths of the cable lengths connected at the joint and is divided transversely into at least three parts. These parts include a central part, surrounding the joint between the cable conductors, and end parts, whereby the central part is electrically insulated from the sheaths of the cables connected at the joint. The end parts are each sealed both to the central part and to the cable sheaths. An essential feature of the joint is that a separate supplementary enclosure is provided for each of said end parts, each supplementary enclosure being sealed both to one of the cables and to the adjacent end of the central part of the fluid-tight enclosure. The supplementary enclosures and the remainder of the central part not protected by the supplementary enclosures are made corrosion resistant.

An object of the present invention is to provide an alternative form of joint structure which also has reduced thermal resistance, measured radially from the conductor axis, whereby the rate of natural cooling of the cable conductors and ferrule is increased and/or heat can be extracted more efficiently from the joint enclosure, in the region of the jointing ferrule, by means of a heat exchanger applied to or forming part of the joint enclosure in this region.

The present invention is based on our discovery that it is not necessary to provide separate supplementary enclosures, each sealed to one of the cables and to the adjacent end of the central part, for insulating and protecting the end parts of the fluid-tight enclosure.

In the joint in accordance with the present invention, the fluid-tight enclosure is divided transversely into three parts including a central part of low thermal resistance surrounding the joint between the cable conductors and two end parts at least partly of metal sealed to the central part and to the cable sheath. When the central part is of metal the end parts will be partly of insulating material and will be so designed as electrically to isolate the central part from the cable sheaths. When the central part is of insulating material each end part can be wholly of metal.

The term "of low thermal resistance" as applied to the central part of the fluid-tight enclosure is intended to comprehend both parts through which heat is readily dissipated to the surrounding soil or atmosphere as compared with central parts of fluid-tight enclosures hitherto employed and parts incorporating or provided with a heat exchanger by which heat is extracted from the conductors and ferrule enclosed thereby.

When the joint is a cross-bonding joint, one bonding conductor is connected to the sheath of the first cable length or to a metal part of the end part connected to that sheath and the other is connected to a terminal passing through the wall of said end part. A connecting lead passes from this terminal through the central part of the fluid-tight enclosure to the other end of the joint and is there connected to the sheath of the second cable length. The connecting lead is insulated from the central part of the fluid-tight enclosure and the terminal is insulated from the first end part and from the central part of the fluid-tight enclosure. It is preferably tubular and concentric with the joint axis.

Various methods of providing a terminal passing through the wall of an end part of the enclosure and of insulating the terminal from the cable sheath at that end of the joint and from the central part of the enclosure are disclosed in the specification of the above mentioned Application.

In fact joints in accordance with the present invention may have all of the structural features of the joints described by way of example in the specification of the above mentioned Application except for the provision of separate supplementary enclosures for each of the end parts. In some installations, for example installations in ducts or tunnels, the end parts may need no protection, in other installations a coating of insulating material may be provided directly over the end parts and any terminals thereon. A further possibility is to provide a single supplementary enclosure of insulating material over the whole of the fluid-tight joint enclosure having a central part of low thermal resistance, which is meant a part through which heat is readily dissipated to the surrounding soil or atmosphere.

An alternative possibility is to incorporate the water jacket in the central part of the fluid-tight enclosure. This part of the enclosure can, for example, consist of a double walled metal tube in which the annular space between the tubes is water-tight and is provided with inlet and outlet pipes for the water supply.

Two preferred forms of joint in accordance with the invention will hereinafter be described by way of example with reference to the accompanying drawings in which:-

FIGS. 2 and 3 are cross-sectional views taken on the lines II—II and III—III respectively in FIG. 1;

FIG. 4 is an elevation of a second form of joint; and

FIG. 5 is an end view of the joint shown in FIG. 4.

Figure 1:
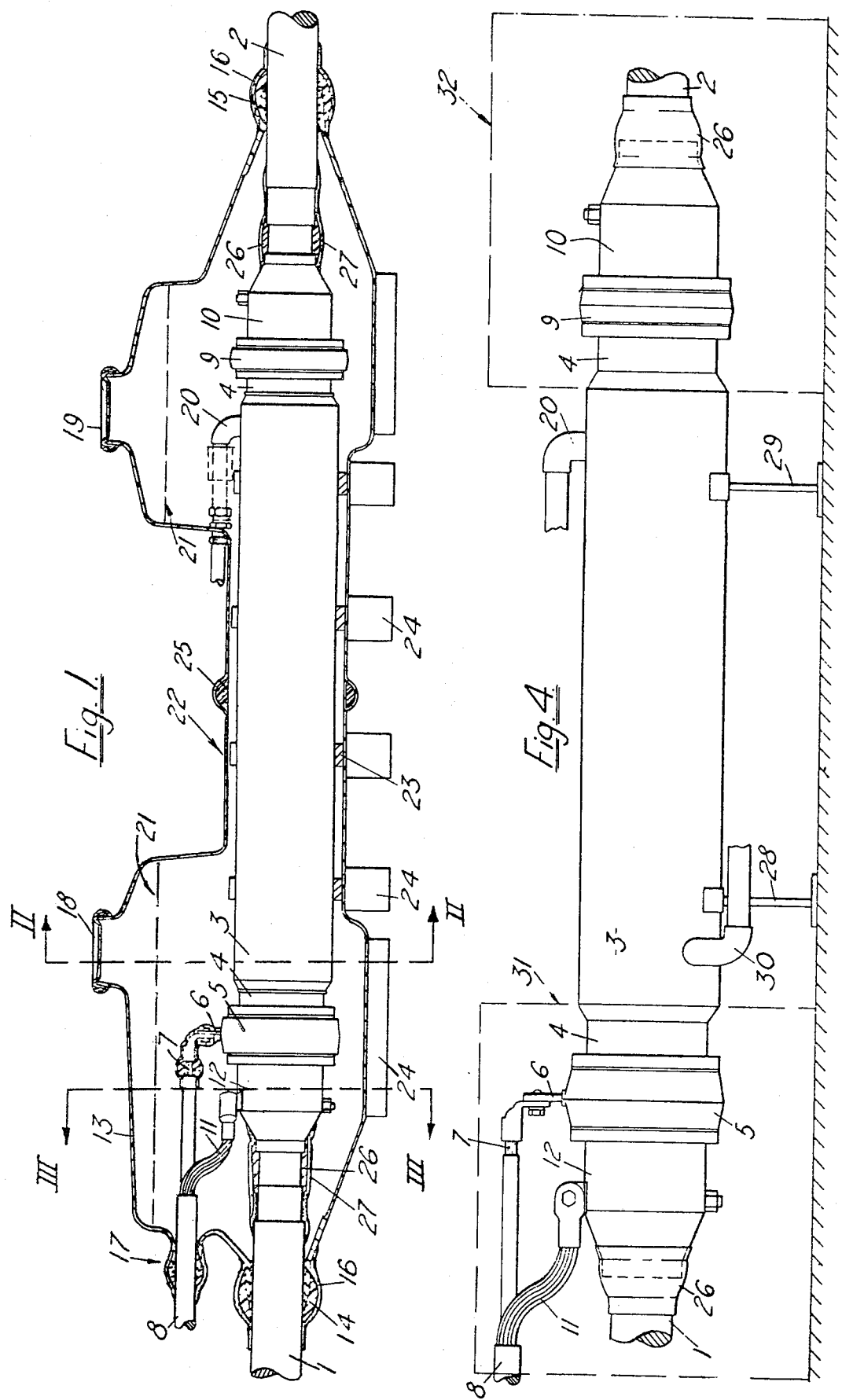
FIG. 1 is an elevation partly in cross-section of the first form of joint.
Figure 2:
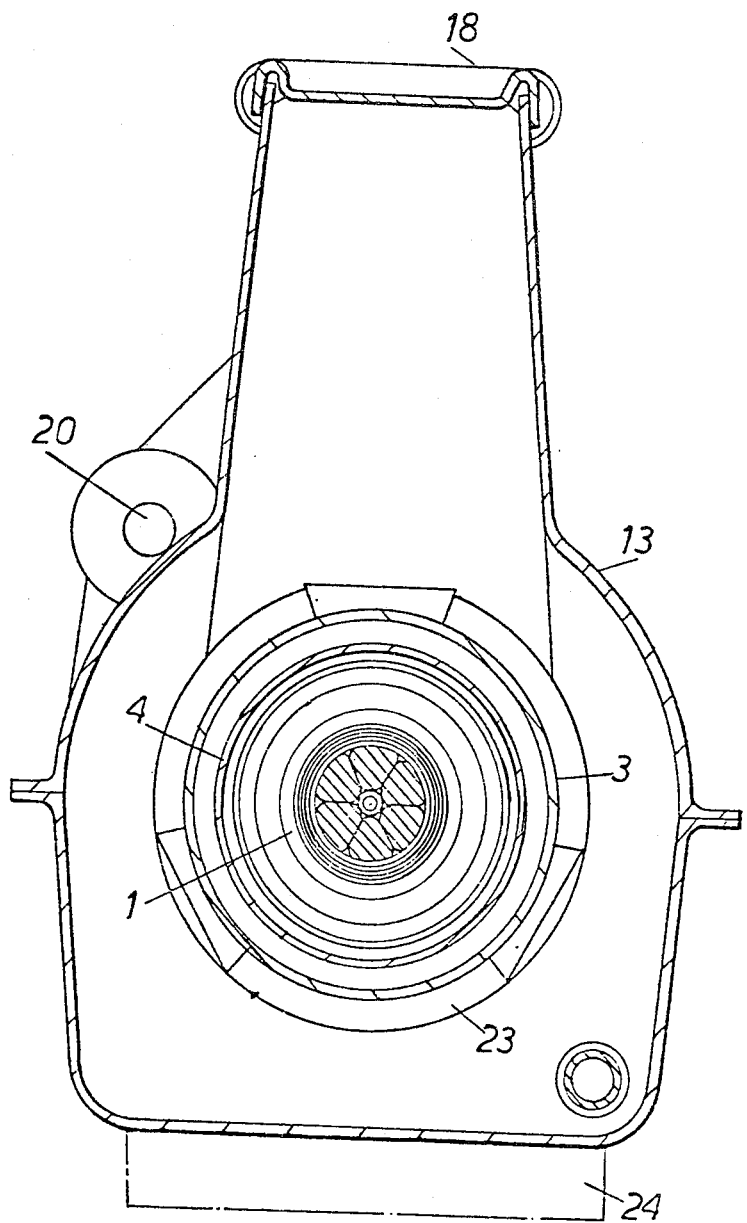

Referring to FIGS 1 to 3, the fluid-tight enclosure for the joint between the conductors of two cable lengths 1 and 2 is of a similar construction to that described with reference to FIGS. 2 and 3 of the specification of the above mentioned application except that an annular water jacket 3 mounted on the central part 4 of the fluid-tight enclosure has one of its ends more closely adjacent to an insulating ring 5 through which a terminal 6 for one conductor 7 of a co-axial cross-bonding cable 8 passes and the other of its ends more closely adjacent to an insulating ring 9 by which the central part 4 is connected to a metal end part 10 plumbed to the sheath of the cable length 2. The other conductor 11 of the co-axial cross-bonding cable 8 is electrically connected to a metal end part 12 plumbed to the sheath of the cable length 1.

The whole of the fluid-tight enclosure for the joint is surrounded by a single supplementary enclosure in the form of a resin-bonded glass fibre shell 13 sealed at 14 and 15 to the two cable lengths 1 and 2 by epoxy resin putty protected by composite layers 16 each consisting of an inner layer of self-amalgamating polyethylene tape and an outer layer of P.V.C. tape. The shell 13 is provided with a cable entry gland 17 for the cross-bonding cable 8, with removable covers 18 and 19, and with glands (not shown) for the inlet and outlet pipes of the water jacket 3; one of these pipes can be seen at 20.

The gland 17, the rims of the covers 18 and 19, and the glands for the water pipes are sealed in a similar manner to that in which the shell 13 is sealed to the two cable lengths, namely by means of a body of plastic compound protected by polyethylene tape and by P.V.C. tape.

The whole of the shell is filled to the level indicated by the dotted lines 21 with a bitumastic insulating compound and, to reduce the thermal resistance of the centre part 22 of the supplementary enclosure, its diameter is considerably reduced to a diameter only slightly greater than that of the central part of the fluid-tight enclosure and its water jacket 3. The centre part 22 of the shell 13 is spaced from the water jacket 3 by wrappings 23 of P.V.C. tape and the enclosure is itself supported on concrete blocks 24. The centre part 22 of the shell is reinforced by embedded material 25.

The plumbs 26 by which the metal end parts 10 and 12 are sealed to the cable sheaths are also protected by polyethylene and P.V.C. tape layers 27.

FIGS. 4 and 5 show a joint provided with a fluid-tight enclosure substantially identical to that shown in FIGS. 1 to 3 (equivalent parts being given the same references) but not provided with a supplementary enclosure since the joint is intended for installation in a duct or tunnel. It will be seen that the central part of the fluid-tight enclosure 4 surrounded by the water jacket 3 is mounted on supports 28 and 29 brazed to the surface of the water jacket 3.

In this case both the water inlet pipe 30 and the water outlet pipe 20 can be seen. In some installations it may be advisable to provide guards, for example of expanded metal, around the ends of the joint enclosure and suitable shapes for such guards are indicated by chain dotted lines 31 and 32. Instead of using individual guards for the two ends of the joint enclosure, an overall guard for the whole of the joint may in some cases be found preferable.

The joints in accordance with the present invention have the main advantages of simplicity and low thermal resistance. They also have the advantage, in common with the joints of the above mentioned application that they are readily adaptable for use in cross-bonded installations and especially in such installations employing concentric cross-bonding cables.

What we claim as our invention is:

1. A joint enclosure enclosing a joint between fluid impregnated metal sheathed power cables comprising a fluid-tight enclosure surrounding the conductor joint and being divided transversely into at least three parts including a central part of low thermal resistance, surrounding the joint between cable conductors, and two end parts, which electrically insulate the central part from the sheaths of the cables connected at the joint and are each sealed both to the central part and to one of the cable sheaths, in which
   a. at one end of the joint a terminal passes through a ring shaped insulating part,
   b. a bonding lead passes through but is insulated from the central part of the fluid-tight enclosure, and
   c. the bonding lead is connected between the terminal and, at the other end of the joint, the cable sheath of one of the cable lenghts connected at the joint.

2. A joint enclosure as claimed in claim 1 in which the bonding lead is tubular and is co-axial with the cable lengths connected at the joint.

3. A joint enclosure as claimed in claim 2 in which the bonding lead is insulated on both its inner and its outer surfaces and is located between the central part of the fluid-tight enclosure and a body of built-up insulation applied to the joint.

4. A joint enclosure as claimed in claim 2 in which the tubular bonding lead overlaps but is not connected to tapering stress screens applied to the end of the built-up insulation on the cable conductors and acts as a screen over the central part of the built-up insulation applied to the joint.

5. A joint enclosure enclosing a joint between fluid impregnated metal sheathed power cables comprising a fluid-tight enclosure surrounding the conductor joint and being divided transversely into at least three parts including a central part of low thermal resistance, surrounding the joint between the cable conductors, and two end parts, which electrically insulate the central part from the sheaths of the cables connected at the joint and are each sealed both to the central part and to one of the cable sheaths, in which the central part comprises a metal tube and
   a. the end part of the fluid-tight enclosure at the first end of the joint comprises a first metal part plumbed to the sheath of one of the cable lengths, a second metal part connected to the first metal part by a first ring shaped insulating part, and a second ring shaped insulating part sealing the second metal part to and insulating it from the central tubular metal part, and in which
   b. a bonding lead passes through the central tubular metal part and is connected at the first end of the joint to a terminal passing through said second metal part and at the other end of the joint to the cable sheath of the other of the cable lengths connected at the joint.

6. A joint enclosure enclosing a joint between fluid impregnated metal sheathed power cables comprising a fluid-tight enclosure surrounding the conductor joint and being divided transversely into at least three parts including a central part of low thermal resistance, surrounding the joint between the cable conductors, and two end parts, which electrically insulate the central part from the sheaths of the cables connected at the joint and are each sealed both to the central part and to one of the cable sheaths, in which the fluid-tight enclosure is surrounded by a supplementary enclosure having a central part of low thermal resistance surrounding at least part of the central part of the fluid-tight enclosure.

7. A joint enclosure as claimed in claim 6 in which the supplementary enclosure is of insulating material.

8. A joint enclosure enclosing a joint between fluid impregnated metal sheathed cross-bonded power cables comprising
   a. a fluid-tight enclosure surrounding the conductor joint and being divided transversely into at least three parts including a central part of a low thermal resistance surrounding the joint between the cable conductors and two end parts which electrically insulate the central part from the sheaths of the cables connected at the joint and are each sealed both to the central part and to the cable sheaths,
   b. a supplementary enclosure for said fluid-tight enclosure sealed to the sheaths of the cable lengths and comprising two end parts, each surrounding one end part of the fluid-tight enclosure, and a central part of low thermal resistance surrounding the central part of the fluid-tight enclosure,
   c. a cable gland in the first end part of the supplementary enclosure,
   d. a bonding cable passing through said gland,
   e. a terminal for a bonding conductor within the first end part of the supplementary enclosure connected to said bonding conductor and to the metal sheath of the first cable length,
   f. a second terminal for a bonding conductor within the first end part and of the supplementary enclosure connected to another bonding conductor and passing through the wall of the fluid-tight enclosure, and
   g. a lead passing through the central part of the fluid-tight enclosure and connected to said terminal and to the sheath of the second cable length.

9. A joint enclosure as claimed in claim 8 in which the bonding lead is tubular and is co-axial with the cable lengths connected at the joint.

10. A joint enclosure as claimed in claim 9 in which the bonding lead is insulated on both its inner and its outer surfaces and is located between the central part of the fluid-tight enclosure and a body of built-up insulation applied to the joint.

11. A joint enclosure as claimed in claim 9 in which the tubular bonding lead overlaps but is not connected to tapering stress screens applied to the end of the built-up insulation on the cable conductors and acts as a screen over the central part of the built-up insulation applied to the joint.

12. A joint enclosure as claimed in claim 8 in which said bonding cable is a co-axial cable comprising a tubular bonding conductor surrounding and insulated from another bonding conductor.

13. In a cable joint in which the conductors of two fluid impregnated metal sheathed power cables are jointed together, a joint enclosure enclosing the cable joint and comprising a fluid tight enclosure divided transversely into at least three parts including a central part of low thermal resistance, which central part surrounds the joint between the cable conductors, and two end parts, which end parts electrically insulate the central part from the metal sheaths of the cables connected at the joint and which end parts are each sealed both to the central part and to one of the cable sheaths, and a heat exchanger which surrounds at least part of the central part of the fluid tight enclosure.

14. A joint enclosure as claimed in claim 13 in which the central part comprises a metal tube and the end parts each comprise
   a. a metal part plumbed to the sheath of one of the cable lengths and
   b. a ring shaped insulating part sealing the central tubular metal part to and electrically insulating it from the said metal end part.

15. A joint enclosure as claimed in claim 13 in which
   a. each end part of the fluid tight enclosure comprises
      i. a tubular metal part plumbed to the cable sheath and
      ii. a ring shaped insulating part carried thereby to act as an end wall of the enclosure and
   b. the central part of the enclosure comprises a metal tube supported at its ends by the ring shaped insulating parts.

* * * * *